United States Patent [19]

Hirao et al.

[11] Patent Number: 4,579,259

[45] Date of Patent: Apr. 1, 1986

[54] COMPOSITION FOR SEALING SLIDING CONTACT SECTION

[75] Inventors: Katsumi Hirao, Osaka; Toshio Miyake, Okayama, both of Japan

[73] Assignees: K.K. Hayashibara Seibutsu Kagaku Yufo; Kanpe Katei Toriyoo K.K., both of Tokyo, Japan

[21] Appl. No.: 706,920

[22] Filed: Feb. 28, 1985

Related U.S. Application Data

[63] Continuation of Ser. No. 495,082, May 17, 1983, abandoned.

[30] Foreign Application Priority Data

Jun. 5, 1982 [JP] Japan .................. 57-96483

[51] Int. Cl.$^4$ ................. B67D 5/42; C08L 1/00
[52] U.S. Cl. ................ 222/389; 106/203; 106/162
[58] Field of Search .............. 106/162, 213, 203; 222/389

[56] References Cited

U.S. PATENT DOCUMENTS

| | | | |
|---|---|---|---|
| 1,990,274 | 2/1935 | Edelman | 106/208 |
| 2,594,498 | 4/1952 | Rohn | 106/208 |
| 3,009,893 | 11/1961 | Barns . | |
| 3,132,570 | 5/1964 | Hoffman . | |
| 3,255,936 | 6/1966 | Healy et al. . | |
| 3,398,007 | 8/1968 | Pillersdorf et al. | 106/128 |
| 3,485,651 | 12/1969 | Ganz | 106/189 |
| 3,784,390 | 1/1974 | Hijiya | 106/213 |
| 3,870,537 | 3/1975 | Hijiya | 106/162 |
| 4,128,507 | 12/1978 | Mitzner | 252/522 |
| 4,141,748 | 2/1979 | Matsunaga | 106/212 |
| 4,235,637 | 11/1980 | Singleton | 106/213 |

FOREIGN PATENT DOCUMENTS

1474/70 1/1974 Japan .

Primary Examiner—Theodore Morris
Attorney, Agent, or Firm—Browdy and Neimark

[57] ABSTRACT

A sealing composition which stops the leakage of a liquefied or compressed gas through a sliding contact section, includes 1 part of a hydrophilic organic polymer and 5–200 parts of a polyol. Usable hydrophilic organic polymers are synthetic and natural polymers including polysaccharides and their derivatives, which have average molecular weights of 10,000–10,000,000. Preferable is pullulan or elsinan which substantially consists of repeating maltotriose units. Any polyols are usable in the invention whether they are in non-crystalline or crystalline form, provided that they bear 2–20 carbon atoms and hydroxyl groups. The present composition may be further admixed with water and/or nonionic or anionic surface-active agent in an appropriate amount to facilitate the preparation of the composition and to regulate the viscosity of the composition.

6 Claims, No Drawings

COMPOSITION FOR SEALING SLIDING CONTACT SECTION

This application is a continuation of application Ser. No. 495,082, filed 5/17/83 now abandoned.

FIELD OF THE INVENTION

The present invention relates to a composition for sealing a sliding contact section, more particularly, it relates to a sealing composition to stop the leakage of a compressed or liquefied gas through the sliding contact section.

DESCRIPTION OF THE PRIOR ART

Generally, oil and mechanical seals are used for sealing sliding contact sections. It is, however, very difficult to seal a compressed or liquefied gas with an oil or mechanical seal.

For example, in the case of an aerosol container as disclosed in Japan Utility Publication No. 1,474/70, a movable piston means is placed therein to separate the liquefied gas area from the product area. When the piston means reciprocally moves within the container, the liquefied propellant gas leaks into the product area through the sliding contact section, i.e. through the narrow gap between the piston and the inside wall of the container. In order to stop such leakage, the use of silicon gum as a sealing agent was proposed. The use of silicon gum, however, results in an insufficient seal, and has an additional demerit that the silicon gum per se does not tolerate long use due to its rapid deterioration. Since no sealing composition which could replace the silicon gum has been developed hitherto, such aerosol container was so far realized.

Thus, there has existed a strong need for a much more effective sealing composition to stop such leakage. As will become apparent from the following, the present invention does satisfy this need.

SUMMARY OF THE INVENTIION

One object of the present invention is to provide a composition for sealing a sliding contact section.

Another object of the present invention is to provide a sealing composition to stop the leakage of a compressed or liquefied propellant gas through the sliding contact section.

Another object of the present invention is to provide a sealing composition which is usable in an aerosol container.

Another object of the present invention is to provide a sealing composition which is usable at a relatively low temperature.

Another object of the present invention is to provide a sealing composition which tolerates long periods of use.

A further object of the present invention is to provide a non-toxic and harmless sealing composition directed to household use.

These and other objects as may become apparent hereinafter have been attained by a composition comprising 1 part by weight of a hydrophilic organic polymer and 5-200 parts by weight of a polyol. The wording "part", as used in the SPECIFICATION, is given by weight.

DETAILED DESCRIPTION OF THE INVENTION

The present inventors have studied and explored a number of compositions which stop the leakage of the compressed or liquefied gas through the sliding contact section, and which satisfy the following requirements:

(1) Such a composition should have an appropriate viscosity and elasticity.
(2) Such a composition should evenly adhere all over the sliding contact section to assure a perfect sealing.
(3) Such a composition should have a fluidity sufficient to satisfy requirement (2) even when the sliding contact section per se moves, e.g. as in the case when the piston means is in reciprocal motion.
(4) Such a composition should be insoluble in the liquefied propellant gas used.
(5) Such a composition should not alter or deteriorate the product when it comes into contact with the product and/or the liquefied gas, as in the case of an aerosol container.
(6) Such a composition should satisfy all requirements from (1) through (5) at living temperature, i.e. about 0°–45° C., as well as retaining such properties over a long period up to 0.5 years, preferably, over 2 years.
(7) Desirably such a composition should be non-toxic and harmless because the composition has the possibility of coming into contact with the human body or permeating thereinto.

The present inventors have investigated various compositions which may satisfy such requirements. These efforts resulted in the finding that a composition comprising 1 part of a hydrophilic organic polymer and 25-200 parts of a polyol, does satisfy these requirements.

As to the hydrophilic organic polymers usable in the present invention, although synthetic polymers, e.g. polyethylene oxide, polyvinyl alcohol and polyvinyl pyrrolidone, are usable, preferably they are natural polymers and their derivatives including water-soluble polysaccharides, e.g. pullulan, elsinan, dextran, levan, mannan, gum arabic, tragacanth gum, guar gum, xanthan gum, carrageenan, pectic substance, hydroxyethyl starch, carboxy methyl cellulose and hydroxyethyl cellulose. Especially, the use of pululan or elsinan substantially consisting of repeating maltotriose units is preferable because they meet requirements (1) through (7) significantly better. The average molecular weight of such a polymer is in the range of 10,000–10,000,000, preferably, 20,000–2,000,000.

The polyols usable in the invention are those which bear 2–20 carbon atoms and hydroxyl groups per molecule, respectively, e.g. ethylene glycol, propylene glycol, glycerin, erythritol, xylitol, sorbitol, mannitol, maltitol, isomaltitol, lactitol, corn syrup, hydrogenated corn syrup and poly-glycerin.

As to the method for preparing the composition, any method may be employed so far as the composition can be prepared with 1 part of the hydrophilic organic polymer and 5-200 parts, preferably, 10-100 parts, of polyol therewith. More particularly, when the polyol is a non-crystalline liquid, e.g. ethylene glycol, propylene glycol or glycerin, such polyol may be added first with the polymer, and then mixed to homogeneity by stirring and heating, generally at 30°–160° C. When the polyol is a crystalline powder, e.g. xylitol, sorbitol or maltitol, it may be melted by heating to a temperature above its melting point, or dissolved in the above mentioned liquid polyol. Alternatively, the polyol powder may be dissolved first in water and the resultant solution then mixed to homogeneity with the hydrophilic organic polymer, similarly as in the case of the above liquid polyol.

The use of appropriate amounts of water and/or surface-active agent may be favorable for obtainment of a sealing composition having a higher stability and homogeneity. Generally, water can be used in order to accelerate the dissolution of the polymer, regulate the viscosity of the composition and to dissolve such crystalline polyol powder. The preferred amount of water against 1 part of the polymer is within the range of 0.05–20 parts.

Usable surface-active agents are those which readily dissolve both the polymer and polyol, and, desirably, are those which are non-toxic or harmless. The preferred surface-active agents are neutral or anionic surface-active agents, e.g. alkali metal salts and sulfosuccinates of higher fatty acids, and sorbitan esters, monoglycerides and sugar esters of fatty acids.

The composition thus obtained satisfies all requirements from (1) through (7). Thus, the composition is favorably usable as a sealing agent to stop the leakage of a compressed or liquefied gas through the sliding contact selection, for example, in an aerosol container wherein a liquefied propellant gas is used, micro compressor, micro pump or in micro oil hydraulic equipment.

Several embodiments of the invention are disclosed hereinafter.

EXAMPLE 1

A mixture of 6 parts of pullulan, having an average molecular weight of 200,000, 93.5 parts of glycerin and 0.5 parts of sugar ester, was mixed to homogeneity by stirring and heating at 110° C. The relative viscosity of the resultant composition was 84–102 poise at 40° C., and 920–1,140 poise at 12° C.

The composition is advantageously usable for sealing the sliding contact section in an aerosol container wherein a liquefied propellant gas is used.

The six month standing of the composition at 45° C. resulted in neither deterioration nor alteration of the composition.

This EXAMPLE illustrates a formulation which causes neither toxicity nor harm to human or animal. Thus, the composition is advantageously usable in various household products wherein a compressed or liquefied gas becomes into contact with a sliding contact section.

EXAMPLE 2

A mixture of 10 parts of pullulan, having an average molecular weight of 100,000, and 90 parts of ethylene glycol, was mixed to homogeneity by stirring and heating at 120° C.

The composition prepared in this EXAMPLE is also useful for sealing the sliding contact section, and compares well with that at EXAMPLE 1.

EXAMPLE 3

A mixture of 3 parts of elsinan, having an average molecular weight of 200,000, 54 parts of glycerin, 42.5 parts of sorbitol powder and 0.5 parts of alkali metal salt of higher fatty acid, was mixed to homogeneity by stirring and heating at 120° C.

The composition is also useful for sealing the sliding contact section and compares well with that of EXAMPLE 1.

EXAMPLE 4

A mixture of 5 parts of elsinan, having an average molecular weight of 300,000, 3 parts of water, 52 parts of ethylene glycol, 39.7 parts of maltitol powder, and 0.3 parts of mono-glyceride of fatty acid, was mixed to homogeneity by stirring and heating at 80° C.

The composition is also useful for sealing the sliding contact section and compares well with that of EXAMPLE 1.

EXAMPLE 5

A composition was prepared similarly as in EXAMPLE 2, except that the pullulan was replaced with hydroxyethyl starch having an average molecular weight of 100,000.

The adhesiveness of the composition is relatively inferior to that of the one disclosed in EXAMPLE 2, but sufficient for the practical use as a composition to seal the sliding contact section.

EXAMPLE 6

A composition was obtained similarly as in EXAMPLE 4, except that gum arabic having an average molecular weight of 300,000 was used in place of the elsinan.

The adhesiveness of the composition is relatively inferior in comparison with that of the one disclosed in EXAMPLE 4, but sufficient for the practical use a composition to seal the sliding contact section.

EXAMPLE 7

A mixture of 10 parts of polyvinyl alcohol, having an average molecular weight of 100,000, 60 parts of glycerin, 29.5 parts of water and 0.5 parts of sugar ester, was mixed to homogeneity by stirring and heating at 30° C.

The storage stability of the composition is relatively low, but sufficient for the practical use as a composition to seal the sliding contact section.

From the foregoing description, it will be apparent that the present invention provides a practical sealing composition to stop the leakage of a compressed or liquefied gas through the sliding contact section of an apparatus wherein such gas is used.

It will be understood by those skilled in the art that various modifications of the present invention as described in the foregoing EXAMPLEs may be employed without departing from the scope of the invention. Many variations and modifications thereof will be apparent to those skilled in the art and can be made without departing from the spirit and scope of the invention herein described.

What is claimed is:

1. A sealing composition, consisting essentially of:
  (a) 1 part by weight of a polysaccharide consisting substantially of repeating maltotriose units and having a molecular weight in the range of 10,000–10,000,000; and
  (b) 5–200 parts by weight of a polyol bearing 2–20 carbon atoms and 2–20 hydroxyl groups.

2. The sealing composition according to claim 1, wherein said polysaccharide is a member selected from the group consisting of pullulan, elsinan and mixtures thereof.

3. The sealing composition according to claim 1, wherein said polyol is a member selected from the group consisting of ethylene glycol, propylene glycol, glycerin, erythritol, xylitol, sorbitol, mannitol, maltitol, isomaltitol, lactitol, corn syrup, hydrogenated corn syrup, poly-glycerin, and mixtures thereof.

4. In an aerosol container having a piston means associated with a discharge valve to separate a propellant gas area and a product area, said propellant gas area being charged with a propellant gas, wherein the product can be spouted when said discharge valve is opened, and wherein an effective amount of a sealant is used in the narrow gap between the piston means and the inside wall of the container to stop leakage of the propellant gas through the narrow gap, the improvement which comprises using as said sealant a composition consisting essentially of:
(a) 1 part by weight of a polysaccharide consisting substantially of repeating maltotriose units and having a molecular weight in the range of 10,000–10,000,000; and
(b) 5–200 parts by weight of a polyol bearing 2–20 carbon atoms and 2–200 hydroxyl groups.

5. The aerosol container according to claim 4, wherein said polysaccharide is a member selected from the group consisting of pullulan, elsinan and mixtures thereof.

6. The aerosol container according to claim 4, wherein said polyol is a member selected from the group consisting of ethylene glycol, propylene glycol, glycerin, erythritol, xylitol, sorbitol, mannitol, maltitol, isomaltitol, lactitol, corn syrup, hydrogenated corn syrup, poly-glycerin, and mixtures thereof.

* * * * *

UNITED STATES PATENT AND TRADEMARK OFFICE
CERTIFICATE OF CORRECTION

PATENT NO.    :   4,579,259
DATED         :   April 1, 1986
INVENTOR(S)   :   HIRAO et al It is certified that error appears in the above-identified patent and that said Letters Patent is hereby corrected as shown below:

Title page:

[73] Assignees:  should read as follows:

--Kanpe Katei Toryoo Kabushiki Kaisha, Osaka and Kabushiki Kaisha
  Hayashibara Seibutsu Kagaku Kenkyujo, Okayama, Japan--.

Signed and Sealed this

Twenty-third Day of February, 1988

*Attest:*

DONALD J. QUIGG

*Attesting Officer*    *Commissioner of Patents and Trademarks*